United States Patent [19]

Schmidt

[11] 4,452,695

[45] Jun. 5, 1984

[54] FULL-FLOW AND BY-PASS FILTER CONVERSION SYSTEM FOR INTERNAL COMBUSTION ENGINES

[75] Inventor: Donald R. Schmidt, San Antonio, Tex.

[73] Assignee: Energy Extension Industries, San Antonio, Tex.

[21] Appl. No.: 513,733

[22] Filed: Jul. 14, 1983

[51] Int. Cl.³ .............................................. B01D 27/10
[52] U.S. Cl. .................................... 210/168; 210/232; 210/249; 210/295; 210/444; 210/DIG. 13; 210/DIG. 17; 285/190; 123/196 A
[58] Field of Search ................ 285/190; 210/132, 168, 210/232, 238, 249, 250, 295, 335, 433.1, 434, 444, DIG. 13, DIG. 17, 416.5; 123/196 R, 196 A

[56] References Cited

U.S. PATENT DOCUMENTS

| | | | |
|---|---|---|---|
| 1,380,276 | 5/1921 | Ward | 210/168 |
| 1,484,607 | 2/1924 | Hunt | 210/168 |
| 1,820,382 | 8/1931 | Ellis | 210/168 |
| 2,073,442 | 3/1937 | Briggs | 210/249 |
| 2,244,574 | 6/1941 | Rogers | 210/249 |
| 2,566,371 | 9/1951 | Quinn | 210/232 |
| 2,707,611 | 5/1955 | Fricke | 210/249 |
| 3,050,189 | 8/1962 | Williams | 210/232 |
| 3,145,035 | 8/1964 | Hanback | 285/190 |
| 3,147,015 | 9/1964 | Hanback | 285/190 |
| 3,315,988 | 4/1967 | Schrotter | 285/190 |
| 3,384,394 | 5/1968 | O'Connor | 285/190 |
| 3,402,253 | 9/1968 | McCracken | 285/190 |
| 3,540,594 | 11/1970 | Sanderson | 210/232 |
| 3,715,035 | 2/1973 | Teeple | 210/249 |
| 4,242,201 | 12/1980 | Stephens | 210/249 |
| 4,298,469 | 11/1981 | Le Blanc | 210/168 |
| 4,371,439 | 2/1983 | Thornton | 210/232 |
| 4,406,784 | 9/1983 | Cochran | 210/168 |

FOREIGN PATENT DOCUMENTS 523707 4/1954 Belgium .............................. 210/168

Primary Examiner—Ernest G. Therkorn
Attorney, Agent, or Firm—Gunn, Lee & Jackson

[57] ABSTRACT

The filter system includes a high performance full-flow filter and the second super efficient by-pass filter. An adapter and adapter bushing is located between the engine block and the full-flow filter. The adapter is tapped to provide a pressure source through a filter hose to the by-pass filter. The by-pass filter is then connected to the low pressure side of the oil by connecting through a special drain plug fitting. The hoses are connected to the by-pass filter and the drain plug through a special pivotal connection to fit any make automobile. The by-pass filter may be mounted inside of a neoprene coated nylon sleeve or by a special mounting bracket.

6 Claims, 6 Drawing Figures

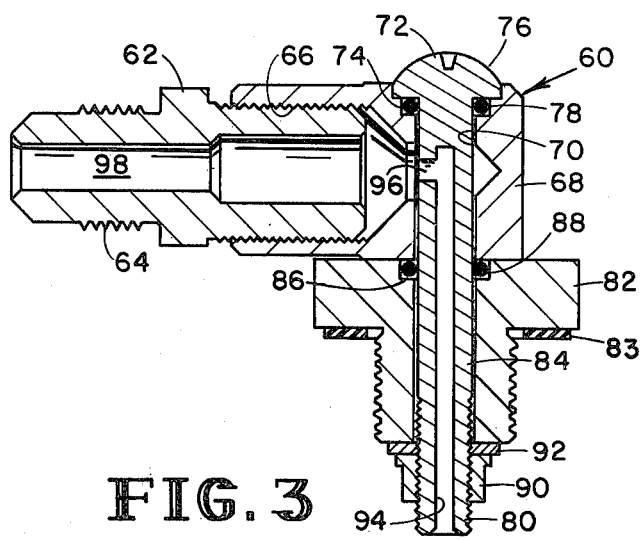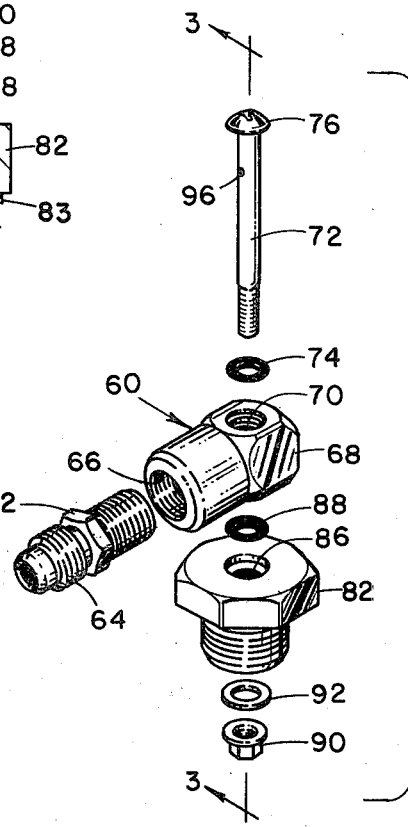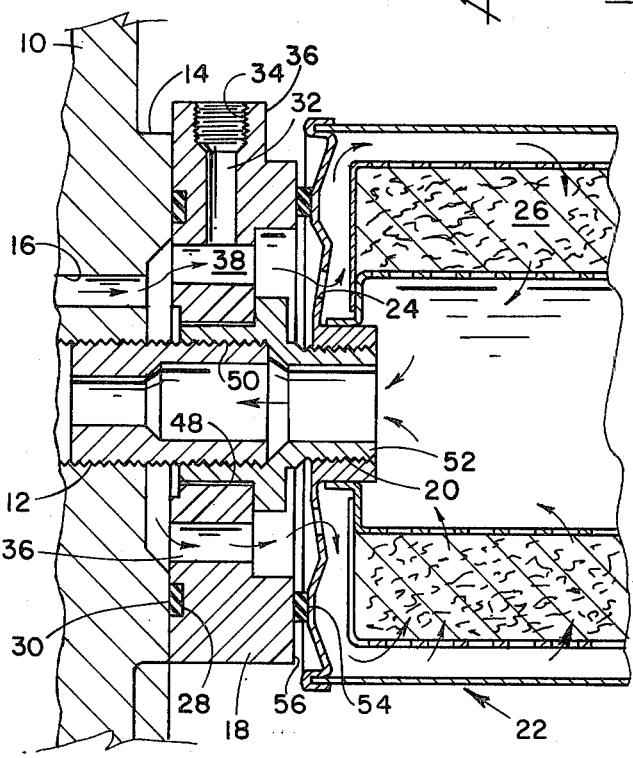
FIG. 3
FIG. 2
FIG. 4

FULL-FLOW AND BY-PASS FILTER CONVERSION SYSTEM FOR INTERNAL COMBUSTION ENGINES

BACKGROUND OF THE INVENTION

The present invention relates to oil filter systems and, more particularly, to a high performance full-flow filter and a super efficient by-pass filter for use in the filter system of an engine. The normal spin-on full-flow filter is disconnected from the engine block and is replaced with a high performance full-flow filter. A special adapter and adapter bushing complete with appropriate gaskets are located between the engine block and the high performance full-flow filter. Tapped from the side of the adapter is a source of pressurized oil which connects through a filter hose to the by-pass filter. A small portion of the oil flowing through the filter system of an engine (approximately five percent) flows through the by-pass filter to the oil pan through a special drain plug fitting. The right angle fittings for the by-pass filter and special drain plug fitting have special O-ring seals and hollow bolts to allow for pivotal movement of the right angle fittings to fit any particular automobile. The drain plug for the oil pan is replaced with a special drain plug that also has a pivotal right angle fitting.

The by-pass filter may be mounted by any suitable means, such as a fixed mounting plate or a sleeve in which the by-pass filter may be suspended at any convenient location. Another alternative is to have a special bracket which may mount the filter at any convenient location.

DESCRIPTION OF THE PRIOR ART

Prior to the present invention, many different types of filter systems have been developed for internal combustion engines, especially for use with automobiles. The most common type of filter used today is the full-flow spin-on disposable filter that is simply removed and thrown away when changing both the oil and filter for the automobile. The term "full-flow" is because the filter is capable of filtering the entire flow of oil for the engine. These filters are usually of the surface type where the oil flows through a single layer of filter paper or the like. They have a high flow rate and may be of reasonably compact size. The full-flow filter requires relatively low pump pressure, but are not efficient to remove all foreign matter from the oil. Continued operation will permit a gradual increase in the amount of foreign matter in the oil, particularly oxides and very fine sludge.

To eliminate this buildup, the present system adapts the internal combustion engine to include a by-pass filter whereby approximately five percent of the oil that would normally flow through the full-flow unit is by-passed to a super efficient by-pass filter. The super efficient by-pass filter is capable of significantly reducing chemical degradation and removing substantially all filterable impurities from the oil, but is intrinsically of lower flow capacity such that it requires the design system pressure to sustain oil flow therethrough.

In the past, combination full-flow and high density filtering have been integrated in one single unit, such as shown in Dahm, et al., U.S. Pat. No. 4,036,755. However, such a filtering system is not made in such a manner that it is connectable to the standard engine filtering system. Also, the high density portion of the filtering would only operate for a much shorter period of time before it would become clogged and the entire flow would then flow through the full-flow portion. Upon clogging of the full-flow portion, the by-pass valve would open and the oil would receive essentially no filtering. The same basic comments are true concerning Belgarde, et al., U.S. Pat. No. 2,995,253. Likewise, Beardsley, U.S. Pat. No. 2,680,520, shows a full-flow and part-flow filter combination. It has the same inherent problems as the previously described full-flow and part-flow filters.

Kennedy, U.S. Pat. No. 2,843,268, is simply another variation of the combination full-flow, part-flow filter that also has the problems of life cycle and the pressure drop that can be utilized in the filtering system itself. Belgarde, U.S. Pat. No. 2,929,605, is simply another modification of the combined full-flow and part-flow oil filter. Allen, U.S. Pat. No. 2,966,296, again shows a combined full-flow and by-pass filter with strainer mounted in one single contiguous housing with only one by-pass valve.

While all of the patents cited hereinabove show improved oil filtering, the present invention adapts the standard spin-on type full-flow filter so that it is replaced with a high performance full-flow filter and a super efficient by-pass filter that is separately installed and mounted in the engine compartment. Adapters are provided for the separate by-pass connection and the mounting of the by-pass filter with the return from the by-pass filter being directly to the oil pan through the oil pan drain plug.

SUMMARY OF THE INVENTION

It is an object of the present invention to provide an improved filtering system for internal combustion engines, including a high performance full-flow filter and a super efficient by-pass filter.

It is another object of the present invention to provide adapters for the standard internal combustion engine normally utilizing a spin-on full-flow type filter which may be replaced with a high performance full-flow filter with an adapter and adapter bushing by-passing a portion of the oil through a filter hose to a by-pass filter through pivotal right angle adapter fittings, thereafter returning a portion of the flow through a special drain plug fitting, which is again pivotal for ease of installation. The pivotal right angle fittings utilize a hollow threaded screw with a cross-bore therein and O-ring seals to allow pivotal motion of the right angle fittings as is necessary during installation.

It is a further object of the present invention to provide a means for mounting the by-pass filter in essentially standard vehicles.

It is yet aanother object of the invention to provide a system for retrofitting engines utilizing special adapters and fittings to provide for a high performance full-flow filter and a super efficient by-pass filter.

It is another object of the present invention to provide a special adapter and adapter bushing for mounting the high performance full-flow filter to the engine block and the tap plate bushing.

It is still another object of the present invention to provide special pivotal right angle fittings for the filter hoses as they connect to the by-pass filter and the drain plug fitting.

It is yet another object of the present invention to provide a method of hanging the by-pass filter at any convenient location inside the engine compartment.

DESCRIPTION OF THE DRAWINGS

FIG. 2 is an exploded perspective view of right angle fittings used in FIG. 1.

FIG. 3 is an assembled section view of FIG. 2 along section lines 3—3.

FIG. 4 is a partial assembled cross-sectional view of the full-flow filter as installed on the engine block along section lines 4—4 of FIG. 1.

DESCRIPTION OF THE PREFERRED EMBODIMENT

Figure 1:
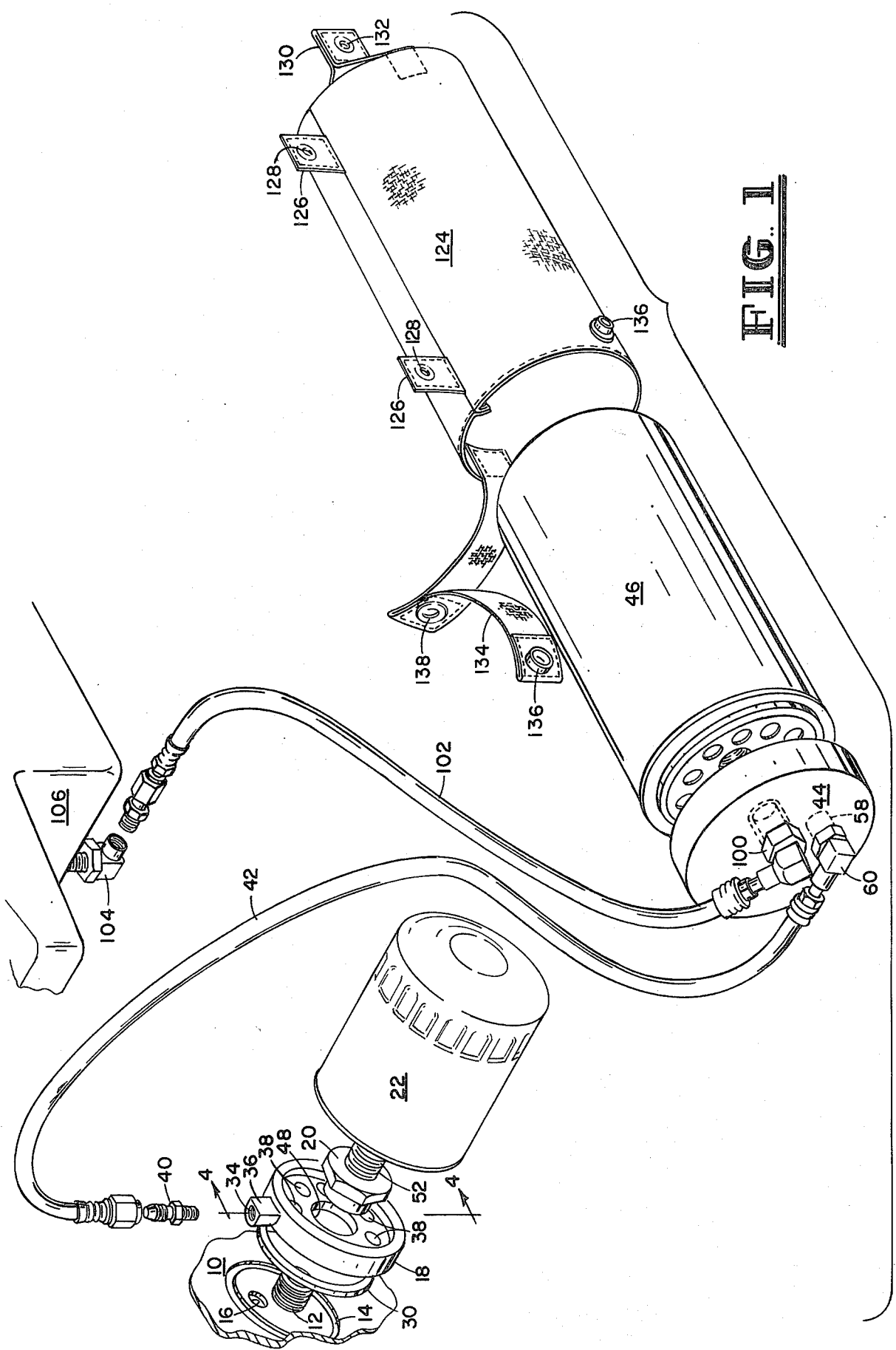
FIG. 1 is a partially exploded perspective view of a full-flow and by-pass filter system as installed on an engine.
Figure 5:
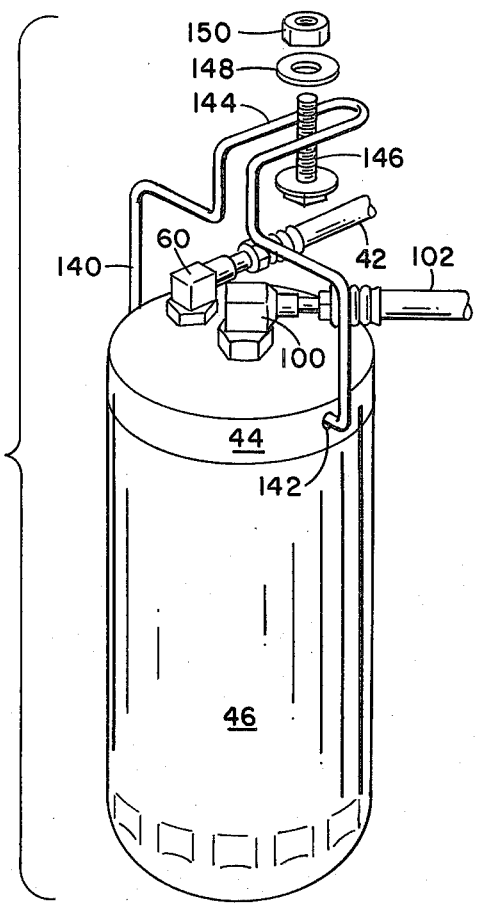
FIG. 5 is a perspective view of an alternative method of mounting the by-pass filter.

Referring to FIG. 1 of the drawings, an engine block 10 has an oil filter bushing 12 mounted therein which is used to connect to a full-flow disposable type filter (not shown). The full-flow disposable type filter butts against the raised boss 14 of the engine block. Oil from an oil pump (not shown) is pumped through opening 16 at an elevated pressure for flowing through the filter system and other parts of the engine.

The standard full-flow disposable type filter normally used on an engine is removed. Thereafter, an adapter 18 is connected to the oil filter bushing 12 by means of a special adapter bushing 20 in a manner as can be more clearly seen in conjunction with the cross-sectional view of FIG. 4.

Connected to the adapter bushing 20 is a high performance full-flow filter 22 that is of the spin-on disposable type. The oil flowing from the oil pump and opening 16 enters full-flow filter 22 through opening 24 and flows around the outside of the filter element 26. Oil flowing through the filter element 26 reenters the engine by flowing through adaptive bushing 20 and oil filter bushing 12. It should be realized that the full-flow filter 22 operates in the same manner as most full-flow filters; however, only about 95% of the engine oil being pumped through opening 16 of the engine block 10 flows through the full-flow filter 22 as will be described in more detail hereinbelow.

Referring to adapter 18 in more detail, an undercut groove 28 is provided so that a seal 30 can be located therein to seal between the adapter 18 and the boss 14 of the engine block 10. Internally within the adapter 18 is a cross-bore 32 with a threaded fitting 34 at the outer termination thereof. The threaded fitting 34 is located within an externally extending boss 36. The cross-bore 32 intersects one of a plurality of parallel flow passages 38 that allows the oil from the engine flowing through opening 16 to also flow through the adapter 18. A hose fitting 40 is threadably connected into the threaded fitting 34 as is shown in FIG. 1. A by-pass filter hose 42 is connected to the hose fitting 40 on a first end and is connected on a second end to a by-pass filter base 44. A by-pass filter 46 is connected to the by-pass filter base 44 as will be described in more detail subsequently.

Again referring to FIGS. 1 and 4 in combination, the adapter bushing 20 is small enough on the first end thereof to be received through the center opening 48 of the adapter 18. Also the first end has internal threads 50 for threadably connecting on oil filter bushing 12. By extending the adapter bushing 20 through the center opening 48 of the adapter 18, and with the seal 30 in proper location, threadably connecting the adapter bushing 20 to the oil filter bushing 12 provides a secure leak-proof connection as shown in FIG. 4.

An outer shank 52 of the adapter bushing 20 is threaded to match the threads of the oil filter bushing 12. Therefore, a full-flow filter 22 may be screwed or "spun" onto the upper shank 52 of the adapter bushing 20 and secured in the manner as shown in FIG. 4. Seal 54 of the full-flow filter 22 seals against the outer surface 56 of the adapter 18. Seals 54 and 30 prevent any leakage of oil from around adapter 18.

In FIG. 1, there is shown the by-pass filter base 44 to which is connected the by-pass filter 46. Oil flowing through the by-pass filter hose 42 will enter through a threaded opening 58 (shown in reference lines in FIG. 1) through by-pass filter base 44 into by-pass filter 46. Threadably connected into the threaded opening is a right angle fitting represented generally by reference numeral 60 in FIGS. 1, 2 and 3.

The right angle fitting 60 includes a hose fitting 62 for threadable connection to by-pass filter hose 42 by means of threads 64. The opposite end of the hose fitting 62 is threadably received in a threaded opening 66 of right angle boss 68. Transverse the threaded opening 66 is transverse opening 70 through which is received a hollow screw 72. At the head of the hollow screw 72 is located an O-ring seal 74, which may be pressed between head 76 of hollow screw 72 and shoulder 78 of the right angle boss 68.

On threaded end 80 of the hollow screw 72, there is located a plug nut 82 having a transverse bore 84 receiving the hollow screw 72 therethrough. The upper portion of the plug nut 82 has a shoulder 86 for compressing O-ring 88 against the right angle boss 68. Threadably connected to the threaded end 80 of the hollow screw 72 is a self-locking nut 90 pressing against washer 92. By tightening the self-locking nut 90, the O-ring seals 74 and 88 prevent the leakage of any oil from the transverse opening 70 and the right angle boss 68. Contained within the hollow screw 74 is a longitudinal passage 94 intersected by a transverse passage 96. Therefore, oil can flow through the by-pass filter hose 42, opening 98 of hose fitting 62, transverse passage 96 and longitudinal passage 94 of hollow screw 72 into the by-pass filter 46.

By use of the type of right angle fitting 60 as just described, the by-pass filter hose 42, hose fitting 62, and right angle boss 68 are free to pivot on the hollow screw 72, while at the same time maintaining a leak-proof seal by means of the O-rings 74 and 88. This allows for ease of installation and pivoting of the by-pass filter hose 42 as is necessary for that installation. Also, a sealing washer 83 is located between the plug nut 82 and by-pass filter base 44 to prevent leakage therearound.

Figure 6:
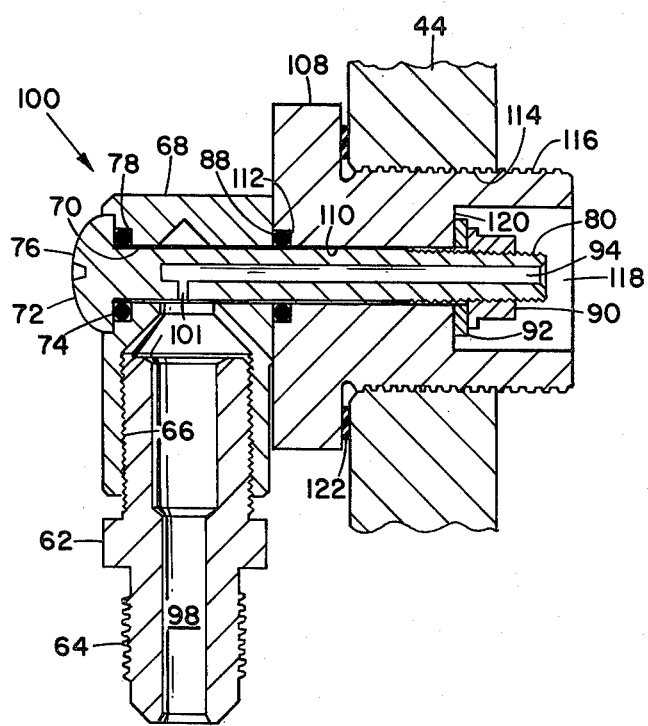
FIG. 6 is a partial assembled cross-sectional view of right angle fitting 100 of FIG. 1.

After the oil flowing through the by-pass filter hose 42 flows through the by-pass filter 46, it flows out through right angle fitting 100, drain plug hose 102, and drain plug 104 back to the oil pan 106 of the automobile. Referring to FIG. 6 in comparison to FIG. 3, differences between the right angle fitting 60 leading into the by-pass filter 44 through threaded opening 58 of by-pass filter base 44 and the right angle fitting 100 can be seen. The same reference numerals will be used when the parts are identical. In FIG. 6, the hose fitting 62, right angle boss 68, hollow screw 72, and O-rings 74 and 88 remain the same. However, plug nut 82 has been replaced with oil filter bushing nut 108. Oil filter bushing nut 108 has a longitudinal opening 110 therethrough for receiving the hollow screw 72. By tightening of the self-locking nut 90, the oil filter bushing nut is pressed against the right angle boss 68 to tighten the O-ring seal 88 against the shoulder 112 of the oil filter bushing nut 108.

Inside of right angle fitting 100 is transverse passage 101, which is smaller than the previously described transverse passage 96. Transverse passage 101 is a restrictive orifice which limits the oil flow therethrough to approximately 0.2 gallons per minute for most engines. However, it may be necessary to adjust up or down the restriction of transverse passage 101 to insure approximately 5% of the oil flows through the by-pass filter 46. This adjustment depends on the design of the particular engine in question.

The oil filter bushing nut 108 is threadably received inside of threaded opening 114 of the by-pass filter base 44. A substantial portion of the threads 116 of the oil filter bushing nut 108 extend through the threaded opening 114 of the by-pass filter base 44 so that the by-pass filter 46 (shown in FIG. 1) may be threadably connected thereto. A portion of the threaded shank of the oil filter bushing nut 108 has a hollow opening 118 terminating in a shoulder 120. This allows the self-locking nut 90 to be tightened inside of the hollow opening 118 thereby making a secure right angle fitting 100 that does not leak. Specifically, sealing washer 122 is sealed between the head of oil filter bushing nut 108 and the by-pass filter base 44.

Referring now to the drain plug 104, the standard drain plug for an engine is replaced with a drain plug 104 that has a right angle fitting essentially identical to FIG. 3. While the threaded portion of the plug nut 82 as shown in FIG. 3 may have to be enlarged, otherwise the drain plug 104 will be essentially identical to the right angle fitting 60 as shown in FIG. 3.

Referring now to FIG. 1, a method for mounting the by-pass filter 46 is provided by sleeve 124. Sleeve 124 has grommet tabs 126 extending therefrom with grommets 128 located therein for connection to any convenient portion on the vehicle. Also there is a bottom grommet tab 130 with grommets 132 therein again for connection of the by-pass filter inside of sleeve 124 at any convenient location. The uppermost portion of the sleeve 124 has a snap-on flap 134 for extending over the forward end of the by-pass filter 46 and by-pass filter base 44. Any type of snap 136 may be utilized and a grommet 138 may be provided in the snap-on flap 134.

As an alternative means of mounting the by-pass filter 46, the by-pass filter base 44 may be drilled on either side thereof and a bracket 140 extending into the opposing holes 142 of the by-pass filter base 44. The mounting bracket 140 would be similar to handles on old fashion fruit jars except the mounting bracket 140 would be of a different shape and made of much stronger material, such as an ⅛ inch iron rod. By the bending of the iron rod which forms the mounting bracket 140 to provide a parallel upper portion 144, the by-pass filter 46 can be mounted at any convenient place inside of the engine compartment by extending a bolt 146 through the parallel upper portion 144 and into any suitable bolt hole location on the vehicle. Thereafter, the bolt 146 need only be attached by a suitable washer 148 and nut 150.

To utilize the present invention in a vehicle, the standard full-flow spin-on type filter is removed and replaced with the high performance full-flow filter 22 as shown in the present system. Also the adapter 18 is installed along with the adapter bushing 22 so that the by-pass filter hose 42 can be connected to the by-pass filter. The by-pass filter 46 is installed in any suitable location. The drain plug hose connects from the by-pass filter to the drain plug of the engine.

When the engine is running, oil will flow through opening 16 in the engine block 10 to the adapter 18. Approximately 95% of the oil will flow through parallel flow passages 38 of adapter 18 into, and through, the full-flow filter 22. However, about 5% of the oil will flow through cross-bore 32 of adapter 18 through the by-pass filter 46 and return to the oil pan 106. Full system pressure of the engine is provided to the by-pass filter 46 and connections thereto. Because a much denser filter medium is being used in by-pass filter 42 than full-flow filter 22, the return for the by-pass filter must be to a low pressure point, such as the oil pan 106. Because the pressure drop in the full-flow filter 22 is very low, it can take the place of the ordinary spin-on filter. By utilizing the increased pressure drop to the oil pan 106, adequate pressure is provided so the constant oil flow through the by-pass filter will assure exceptionally clean oil, while at the same time a vast majority of the oil will continue to flow along its normal flow path through the full-flow filter 22.

I claim:

1. A combination full-flow and by-pass oil filter conversion system for an internal combustion engine adapted for replacing a normal spin-on full-flow filter threadably connected to an oil filter bushing, said engine having a drain plug at a low pressure side of an oil system having an oil pump, said conversion system comprising:

adapter means connected to said oil filter bushing by an adapter bushing for sealing said adapter means around said oil filter bushing, said adapter means having at least one oil flow passage generally parallel to said oil filter bushing to allow oil flow from said oil pump therethrough, a cross-bore intersecting said oil flow passage to allow by-pass oil flow therethrough;

a high performance full-flow filter threadably connecting to said adapter bushing, after flow of oil through said full-flow filter, said oil being returned through said adapter bushing and said oil filter bushing to said engine;

by-pass filter connected through a first flexible hose member to said cross-bore which is connected to a first end of said first flexible hose member to receive said by-pass oil from said oil pump;

a base plate between a second end of said first flexible hose member and said by-pass filter, said second end of said first flexible hose member being connected through a first right angle fitting with said base plate to said by-pass filter;

second flexible hose member being connected on a first end to said by-pass filter through a second right angle fitting to allow said by-pass oil to flow from said by-pass filter;

drain plug having a drain return passage therethrough, said drain return passage having a third right angle fitting connected to a second end of said second flexible hose member to allow said by-pass oil to return therethrough to said low pressure side of said oil pump; and means for mounting said by-pass filter and base plate with respect to said engine;

said high performance full-flow filter and said by-pass filter being of such respective densities and filtering capabilities that a great majority of oil flowing from said oil pump flows through said full-flow filter with a minimum pressure drop while the remainder of the oil from said oil pump is said by-pass oil and flows through said by-pass filter;

at least one of said first, second, and third right angle fittings are pivotal;

said right angle fittings that are pivotal include a hose fitting threadably connected to a right angle boss having a threaded opening intersected by a longitudinal opening therethrough, a hollow screw in flow communication with said by-pass oil flowing through said threaded opening of said right angle fitting to allow said by-pass oil flow through said hollow screw, said hollow screw being sealed with respect to said longitudinal opening; and said right angle fittings that are pivotal further include a plug nut sealably secured to a lower end of said hollow screw, said plug nut providing for right angle connection to either said base plate or adapted to connect to an oil pan of said engine.

2. The conversion system as recited in claim 1 wherein said hollow screw has a longitudinal passage intersected by a transverse passage for said by-pass oil flow therethrough.

3. The conversion system as recited in claim 2 wherein all of said first, second and third right angle fittings are pivotal.

4. The conversion system of claim 3 wherein said mounting means include a flexible sleeve in which said by-pass filter is removably located, said flexible sleeve having tabs with holes therein for securing said flexible sleeve and by-pass filter with respect to said engine.

5. The conversion system of claim 3 wherein said mounting means includes a bracket member pivotally secured on both sides of said base plate, said bracket member being shaped to have a closely spaced parallel upper portion thereof for securing said by-pass filter with respect to said engine with a single bolt.

6. The conversion system of claim 3 wherein at least one of said longitudinal passages is restricted to limit oil flow through said by-pass filter.

* * * * *